United States Patent [19]

Kyuma

[11] Patent Number: 5,125,094
[45] Date of Patent: Jun. 23, 1992

[54] APPARATUS FOR USING AN ALU AS A TEMPORARY STORAGE FOR DATA DURING AN OTHERWISE IDLE CYCLE OF THE ALU

[75] Inventor: Yuriko Kyuma, Kawasaki, Japan
[73] Assignee: Kabushiki Kaisha Toshiba, Kawasaki, Japan
[21] Appl. No.: 404,066
[22] Filed: Sep. 8, 1989

Related U.S. Application Data

[63] Continuation of Ser. No. 941,433, Dec. 15, 1986, abandoned.

[30] Foreign Application Priority Data

Dec. 16, 1985 [JP] Japan ................. 60-282418

[51] Int. Cl.⁵ .................................. G06F 1/00
[52] U.S. Cl. .................... 395/775; 395/250; 364/DIG. 2; 364/923.5; 364/948.3; 364/939.7
[58] Field of Search ... 364/200 MS File, 900 MS File

[56] References Cited

U.S. PATENT DOCUMENTS

| | | | |
|---|---|---|---|
| 3,818,202 | 6/1974 | Ellison | 364/716 |
| 4,155,118 | 5/1979 | Lamiaux | 364/200 |
| 4,377,846 | 3/1983 | Yoshida | 364/736 |

OTHER PUBLICATIONS

Hayes, "A Survey of Bit-Sliced Computer Design," Journal of Digital Systems, vol. V, No. 3, pp. 203-250, Fall 1981.
Fenner et al., "MASCO: The Design of a Microprogrammed Processor," Computer, vol. 18, No. 3, pp. 41-53, IEEE Mar. 1985.
Lass, "A Fourth-Generation Computer Organization," Proceedings of the Spring Joint Computer Conference (A.F.I.P.S. Conf. Proceedings), vol. 32, pp. 435-440, Apr. 30-May 2, 1968.
Karstad, "Microprogramming and Bit-Slice Architecture," Computer Design, vol. 23, No. 3, pp. 213-223, Mar. 1984.
Sun Microsystems, "Windows and Window Based Tools: Beginner's Guide," pp. 39-44, Part No: 800-12-87-03, Revision A, Feb. 17, 1986.

*Primary Examiner*—Thomas C. Lee
*Assistant Examiner*—Richard Lee Ellis
*Attorney, Agent, or Firm*—Finnegan, Henderson, Farabow, Garrett and Dunner

[57] ABSTRACT

A data-processing device has a clock generator for generating pulse signals $\phi 1$ and $\phi 2$, an ALU capable of executing various arithmetic-logic operations during cycles corresponding to the pulse signals $\phi 1$ and $\phi 2$, and a control unit for generating a control signal which causes the ALU to execute an arithmetic-logic operation according to an instruction. This data-processing device further includes a transfer switch for causing the ALU to execute an arithmetic-logic operation, which is for generating output data equal to input data, during a cycle in which the ALU would otherwise be idle.

6 Claims, 4 Drawing Sheets

FIG. 4

| CYCLE | ADDRESS BUS AH, AL / BH, BL | X-INPUT Y-INPUT ALU | TEMPORARY REGISTER T1 | TEMPORARY REGISTER T2 | INCREMENTOR DECREMENTOR | PROGRAM COUNTER | R/W̄ |
|---|---|---|---|---|---|---|---|
| 1 | OPERATION CODE ADDRESS BH, BL | — | | | +1 | | 1 |
| 2 | INDEX OFFSET DATA ADDRESS BH, BL | — | | | +1 | | 1 |
| 3 | IMMEDIATE DATA ADDRESS BH, BL | "00", INDEX OFF-SET DATA (HEX) ADDITION | | | +1 | | 1 |
| 4 | | XL DATA, RESULT DATA ADDITION | XH DATA → | IM-MEDIATE DATA → | +1 (H) | NEXT OPERATION CODE ADDRESS | 1 |
| 5 | RAM DATA ADDRESS BH, BI | — | | | 0 | | 1 |
| 6 | | RAM DATA, T2 DATA "AND" OPERATION | | | 0 | | 1 |
| 7 | RAM DATA ADDRESS BH, BL | — | | | +1 | | 0 |
| 8 | OPERATION CODE ADDRESS BH, BL | — | | | +1 | →  | 1 |

FIG. 5

| CYCLE | ADDRESS BUS AH | ADDRESS BUS AL | X-INPUT ALU | Y-INPUT ALU | TEMPORARY REGISTER T1 | TEMPORARY REGISTER T2 | INCREMENTOR DECREMENTOR | PROGRAM COUNTER | R/W̄ |
|---|---|---|---|---|---|---|---|---|---|
| 1 | S7 | S8, S16 | — | | | | S9, S10 | | 1 |
| 2 | S9 | S10, S16 | — | | | | S9, S10 | | 1 |
| 3 | S9 | S10, S16 | S15, S17 | S2 | | | S9, S10 | | 1 |
| 4 | | | S14, S17 | S1 | S13, S11 | S2, S12 | S14, S5, S10 | | 1 |
| 5 | S9 (CARRY) S11 (NO CARRY) | S1, S16 | — | | | | S9, S10 | | 1 |
| 6 | | | S2, S17 | S12 | | | S9, S10 | | 1 |
| 7 | S9 | S10, S16 | — | | | | S9, S10 | S9, S10 | 0 |
| 8 | S7 | S8, S16 | — | | | | | | 1 |

APPARATUS FOR USING AN ALU AS A TEMPORARY STORAGE FOR DATA DURING AN OTHERWISE IDLE CYCLE OF THE ALU

This application is a continuation of application Ser. No. 06/941,433, filed Dec. 15, 1986 now abandoned.

BACKGROUND OF THE INVENTION

This invention relates to a data-processing device, and, more particularly, to a data-processing device capable of accepting, for example, AIM (AND Immediate Data) instructions.

In general, an arithmetic-logic unit (ALU) in a central processing unit (CPU) performs the following operations during the execution of various instructions:

an arithmetic-logic operation designated by each instruction;
an operation for the changing of flags; and
an operation for addressing.

During the cycles in which no operations are executed, i.e., during the idle cycles, meaningless or invalid data exists in the ALU.

In developing CPUs, one of the key problems is how to realize instructions that can be executed with the minimum number of execution cycles and the highest efficiency, using the limited hardware of internal buses and registers. As matters stand, the effective execution of instructions cannot easily be realized without additional hardware such as temporary registers and internal buses.

A method for executing the index mode of an AIM (AND Immediate Data) instruction will now be described. This instruction makes a logical product of the contents of a RAM and immediate data and stores the logical product in the RAM.

More specifically, the AIM instruction is a composite instruction made up of the following three functions:

(1) storing the RAM data in an accumulator;
(2) making the logical product of the data in the accumulator and the immediate data, and storing the logical product in the accumulator; and
(3) storing the accumulator data in the RAM.

Ordinarily, the instruction of the index mode has a format of two bytes, in which the first byte contains an operation code and the second byte contains index offset data.

The AIM instruction, however, is formed of three bytes, in which the one additional byte is for the operand of the immediate data. To execute this instruction at high speed, numerous registers are required. When the executing hardware has a limited number of registers it is very difficult to speed up the execution of the instruction while maintaining a satisfactory level of the practicability of the data-processing device.

SUMMARY OF THE INVENTION

Accordingly, it is an object of the present invention to provide a data-processing device capable of effectively executing instructions, without the need to increase the number of registers.

To achieve the above object, there is provided a data processing device performing a series of instructions, at least one of which specifies an arithmetic-logic operation and input data, the data processing device comprising: arithmetic-logic means for performing an arithmetic-logic operation specified by a selected one of the series of instructions, clock generating means, connected to the arithmetic-logic means, for generating a clock signal defining machine cycles of the arithmetic-logic means, wherein a machine cycle during which the arithmetic-logic means performs no operation specified by the selected instruction is called an idle cycle, and control means, connected to the clock generating means and the arithmetic-logic means, for sending input data specified by the selected instruction to the arithmetic-logic means, and for causing, during an idle cycle, the arithmetic-logic means to store the input data by producing output data identical to the input data.

During an idle cycle, data contained in an executing instruction and a predetermined constant are input to the ALU. The ALU executes a predetermined logic operation yielding the data contained in the executing instruction. Thus, the ALU can be used as a register during idle cycles.

BRIEF DESCRIPTION OF THE DRAWINGS

FIG. 4 shows a sequence of controls in which the control unit of FIG. 1 controls logic components according to the AIM instruction.

FIG. 5 shows additional controls in the sequence of FIG. 4.

DETAILED DESCRIPTION OF THE PREFERRED EMBODIMENTS

A data-processing device according to an embodiment of the present invention will now be described, with reference to FIGS. 1 to 5.

Figure 1:
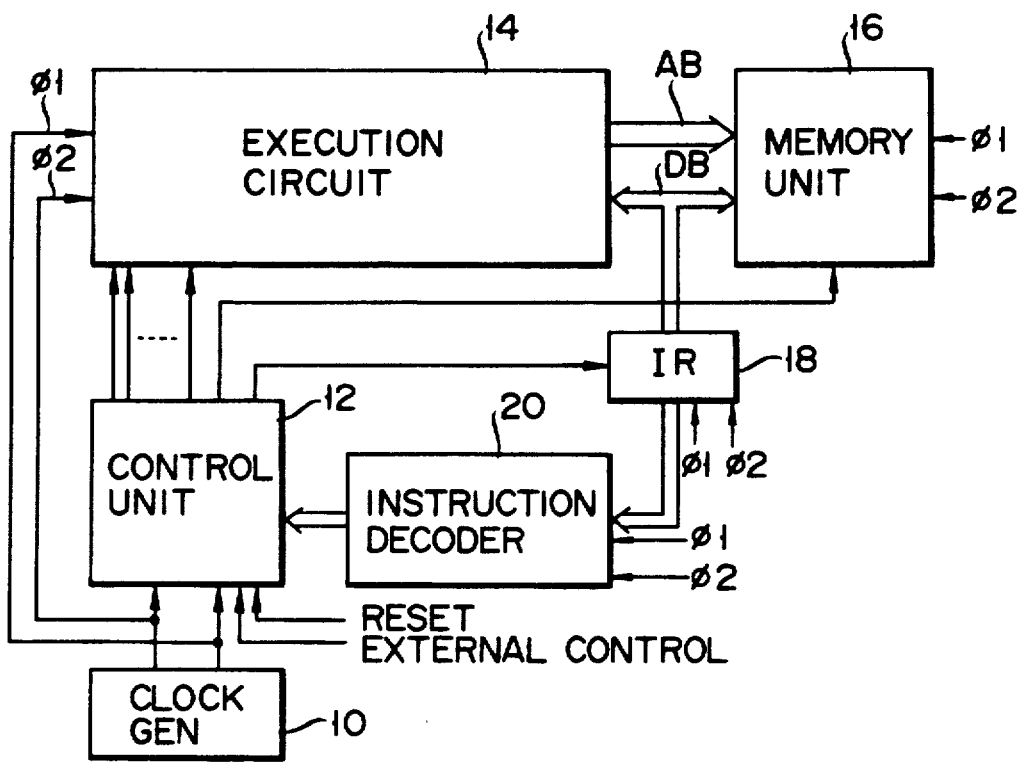
FIG. 1 shows a block diagram of an embodiment of a data-processing device according to the present invention.

FIG. 1 is a block diagram of a data-processing device according to the present invention. As is shown in FIG. 1, this device includes such logic components as clock generator 10, control unit 12, execution circuit 14, memory unit 16, instruction register 18, and instruction decoder 20. In this embodiment these logic components are packaged into one LSI chip.

Pulse signals $\phi 1$ and $\phi 2$ of the same frequency are generated as a clock signal, by clock generator 10. Pulse signals $\phi 1$ and $\phi 2$ are set to have a specific phase difference, and the interval between two successive leading edges of pulse signal $\phi 1$ corresponds to a machine cycle. Each machine cycle corresponds to the period of time required for completing the execution of one arithmetic-logic operation, which is performed by execution circuit 14.

Pulse signals $\phi 1$ and $\phi 2$ are supplied to control unit 12, execution circuit 14, memory unit 16, instruction register 18, and instruction decoder 20. In order to control execution circuit 14, memory unit 16, and instruction register 18, control unit 12 is provided with signal generators for generating various types of control pulses.

Pulse signals $\phi 1$ and $\phi 2$ are used as a reference when each of these types of control pulses is generated. Each control pulse is generated in a specific sequence by control unit 12.

Several sequences corresponding to the type of instructions accepted by this data-processing device are programmed in control unit 12. Any of these sequences can be selected by the output signal of instruction decoder 20. Control unit 12 also has a reset terminal for receiving a reset signal from an external source. When the control unit is supplied with this reset signal, it conducts a procedural control process to begin data processing. Under the control of control unit 12, execution circuit 14 accesses memory unit 16 and reads out an operation code of an initial instruction therefrom. The address signal is fed from execution circuit 14 to memory unit 16 via a 16-bit address bus AB. The output data of memory unit 16 is supplied to an 8-bit data bus DB. The readout operation code is latched into instruction register 18 and decoded by instruction decoder 20. Control unit 12 causes execution circuit 14 to execute the instruction according to the decoded signal.

The logic components other than control unit 12 will now be described in detail.

Memory unit 16 is formed of read-only memories (ROM) and random-access memories (RAM), or only of RAM, and has an address space of, for example, 64K bytes for storing the execution program and data. The execution program includes various instructions required for the specific data processing to be performed. These instructions are stored in successive memory locations of memory unit 16. Each instruction has instruction words whose number corresponds to a specific addressing mode, such as an extend mode, a direct mode, or an index mode.

The index mode will now be described.

Figure 2A:
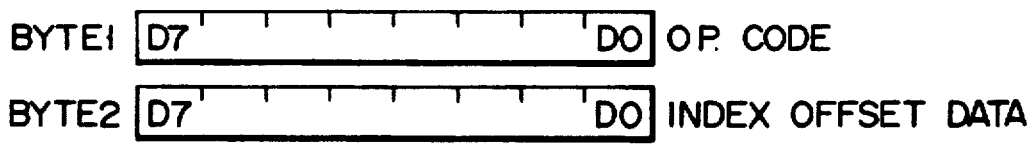
FIGS. 2A and 2B show instruction-word formats of the instructions of the index mode executed by the data-processing device of FIG. 1.

FIG. 2A shows an ordinary index mode instruction, e.g., an ADDA (Add Accumulator) instruction, which is used for processing the data in the accumulator (which will be described later). The instruction has a 2-byte instruction word format. As is shown, the operation code and the index offset data are assigned to the first and second bytes, respectively.

Figure 2B:
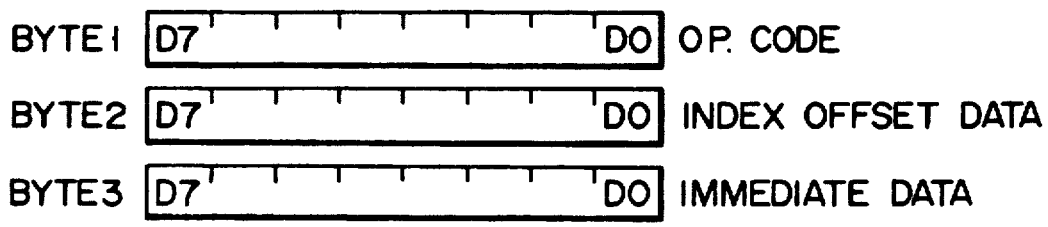

FIG. 2B shows a special index mode instruction, e.g., an AIM (AND Immediate Data) instruction, which is used for processing immediate data. The instruction has 3-byte instruction word format. The operation code, index offset data, and immediate data are assigned to first, second, and third bytes, respectively. Any of the memory locations of memory unit 16 is selected by the related address signal generated by execution circuit 14. Read and write operations of data for memory unit 16 are controlled by a R/$\overline{W}$ signal from control unit 12.

Data bus DB transfers data bidirectionally between execution circuit 14 and memory unit 16. Instruction register 18 is connected to data bus DB, for latching the specific operation code of each instruction read out from memory unit 16 onto data bus DB. The latching operation of instruction register 18 is controlled by a control pulse from control unit 12. Instruction decoder 20 decodes the data (i.e., operation code) latched by instruction register 18, and supplies it to control unit 12.

All the lines in buses DB, BI, BL, BH, BX, and BY (some of which are described below) are periodically precharged to a predetermined potential, for example 5V, by a precharging circuit (not shown). The precharging of buses BI, BL, BH, BX, and BY is performed in response to each pulse signal $\phi 2$, and the precharging of bus DB is performed in response to each pulse signal $\phi 1$. Signal transfer is performed by selectively discharging the lines in each bus. Address bus AB is not involved in the precharge operation and is, therefore, capable of transferring data for substantially the entire period of each machine cycle.

Figure 3:
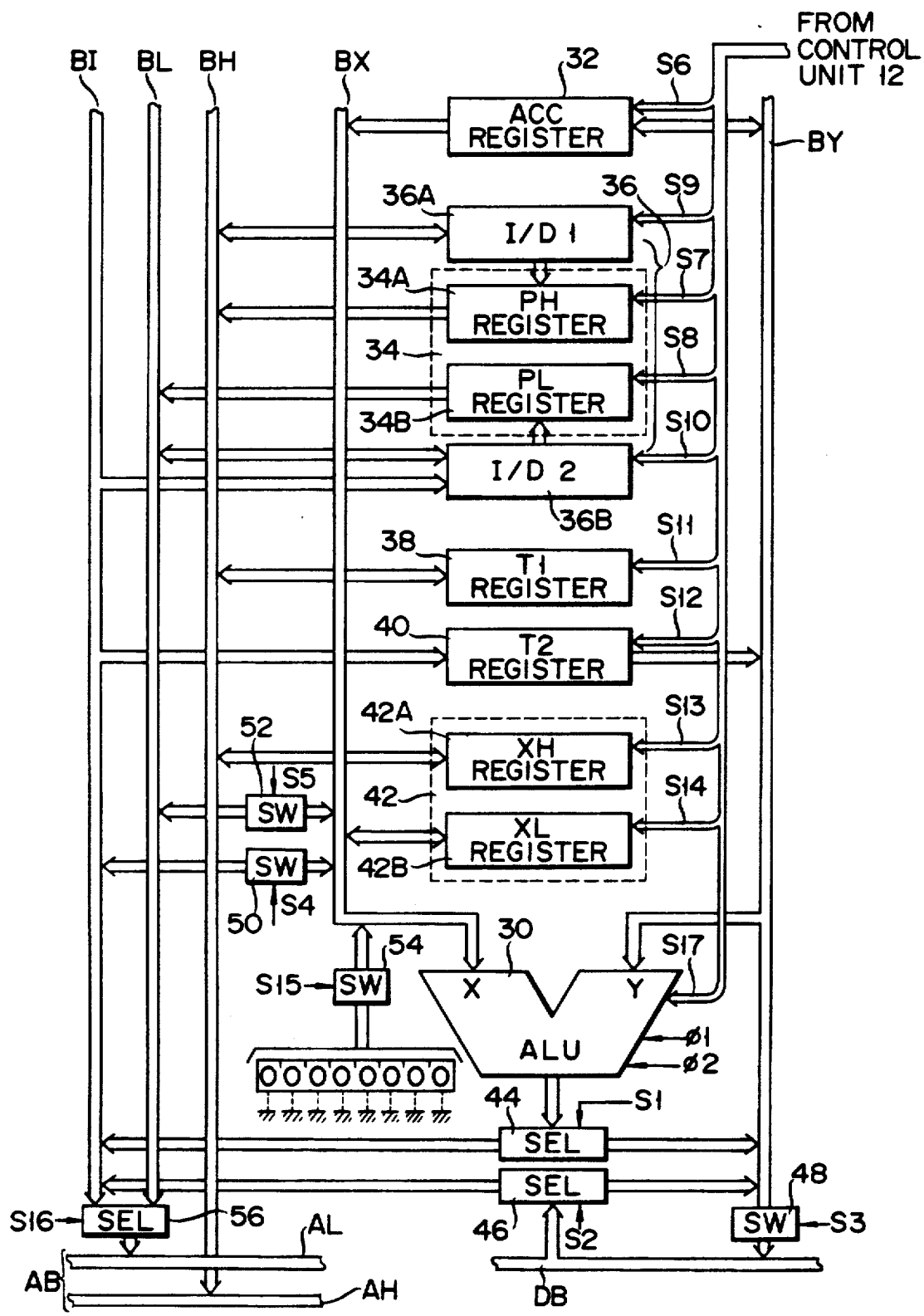
FIG. 3 shows, a block diagram of a detail of a portion of an execution circuit shown in FIG. 1.

FIG. 3 shows a portion of execution circuit 14 in detail. Execution circuit 14 includes ALU 30, accumulator register 32, PH and PL registers 34A and 34B, incrementor/decrementor, (I/D) registers 36A and 36B, temporary registers 38 and 40, and XH and XL registers 42A and 42B. ALU 30 performs the arithmetic-logic operation using 8-bit data. Registers 32, 34A, 34B, 38, 40, 42A, and 42B can each store 8-bit data. PH and PL registers 34A and 34B together form 16-bit program counter 34, XH and XL registers 42A and 42B together form 16-bit index register 42, and incrementor/decrementor registers 36A and 36B together form address counter 36.

Execution circuit 14 further includes a high-order address bus BH, a low-order address bus BL, an intermediate bus BI, an X-input data bus BX, and a Y-input data bus BY. A high-order portion AH of address bus AB is connected to address bus BH, and a low-order portion AL of address bus AB is connected to address bus BL via selector 56 and intermediate bus BI. Selector 56 is controlled by a control signal S16 from control unit 12. A data bus BX is connected to an X-input port of ALU 30 and a data bus BY is connected to a Y-input port of ALU 30. An output port of ALU 30 is connected to Y-input data bus BY and intermediate data bus BI via a selector 44. Selector 44 supplies the output data of ALU 30 to either bus BY or bus BI, under control of a control signal S1 from control unit 12.

Data bus DB is connected to intermediate bus BI and Y-input data bus BY via a selector 46. Selector 46 supplies the data from data bus DB to either bus BI or bus BY, under control of a control signal S2 from control unit 12. Y-input data bus BY is connected to data bus DB via a transfer switch 48. Transfer switch 48 transfers data from bus BY to bus DB, under control of a control signal S3 from control unit 12. Intermediate bus BI is connected to X-input data bus BX via a transfer switch 50. Transfer switch 50 bidirectionally transfers data between buses BI and BX, under control of a control signal S4 from control unit 12. Low-order address bus BL is connected to X-input data bus BX via a transfer switch 52. Transfer switch 52 bidirectionally transfers data between buses BL and BX, under control of a control signal S5 from control unit 12.

Accumulator register 32 is connected to X-input data bus BX and Y-input data bus BY. The data input/output operation of register 32 is controlled by a control signal S6. PH register 34A is connected to high-order address bus BH and an output port of I/D register 36A. PL register 34B is connected to low-order address bus BL and an output port of I/D register 36B. The data input/output operations of registers 34A and 34B are controlled by a control signal S7 and a control signal S8, respectively. I/D registers 36A and 36B are connected to high-order and low-order address buses BH, and to BL and intermediate bus BI, respectively.

The data input/output operations of I/D register 36A and 36B are controlled by respective control signals S9 and S10. Temporary register 38 is connected to high-order address bus BH. The data input/output operation of register 38 are controlled by a control signal S11. Temporary register 40 is connected to intermediate bus BI and Y-input data bus BY. The data input/output operations of register 40 are controlled by a control signal S12. XH register 42A is connected to high-order address bus BH and XL register 42B is connected to X-input data bus BX. The data input/output operations of registers 42A and 42B are controlled by control signals S13 and S14, respectively. Control signals S6 through S14 are generated by control unit 12.

ALU 30 receives a control signal S17 from control unit 12 and also receives pulse signals φ1 and φ2 from the clock generator. Control signal S17 designates the type of arithmetic-logic operation to be executed by ALU 30. ALU 30 simultaneously latches the data on X-input and Y-input data buses BX and BY, in response to pulse signal φ1, and executes the designated operation. ALU 30 also supplies, to selector 44, the data resulting from the operation, in response to pulse signal φ2.

Accumulator register 32 is used for storing data during the execution of, for example, an instruction of the ordinary index mode. In this case, the data in accumulator register 32 is supplied to the X-input of ALU 30, and is then processed together with the data supplied from memory unit 16 to the Y-input of ALU 30.

Program counter 34 is used for storing the data representing one memory address in memory unit 16. PH register 34A stores the high-order byte of of this address, while PL register 34B stores the low-order byte thereof.

I/D registers 36A and 36B of address counter 36 are respectively used for pre-storing the one-byte data supplied to PH register 34A and PL register 34B. Before storing this data, registers 36A and 36B perform one of the following operations on the data supplied from respective buses:

(a) increment the data by "1";
(b) decrement the data by "1"; or
(c) perform no transformation of the data.

Control signals S9 and S10 control the above three operation functions of I/D registers 36A and 36B, in addition to the input/output of the data from registers 36A and 36B.

Temporary registers 38 and 40 are general registers for temporarily storing data. Specifically, temporary register 38 is used for temporarily storing the contents of XH register 42A, for example. Temporary register 40 is used for temporarily storing, for example, the immediate data.

Index register 42 is used for addressing the 256-byte data area of memory unit 16. For example, reference data representing the initial address of the data area is preset in index register 42. This reference data is combined with 8-bit index offset data during execution of an index mode instruction. More specifically, ALU 30 adds the content of XL register 42B to the index offset data to obtain an address of RAM data.

This data-processing device further comprises a transfer switch 54 for supplying data "00" (hexadecimal number) to the X-input of ALU 30. Transfer switch 54 is controlled by a control signal S15 supplied from control unit 12. Transfer switch 54 is connected between X-input data bus BX and a ground terminal which preferably is set to 0V potential. When transfer switch 54 is turned on, the transfer lines of bus BX are discharged to have a potential of 0V. By means of this discharge, the X-input data of ALU 30 is forcibly set to "00".

In this embodiment, preset data are supplied from the memory unit 16 to the corresponding registers during execution of the program instruction. However, a data may also be supplied via any one of the buses from an external source. In this case, control unit 12 is externally controlled via an external control terminal.

One operation of this data-processing device will now be described, with reference to FIGS. 4 and 5. In this operation, control unit 12 controls the necessary logic components in a specific sequence corresponding to the AIM instruction. FIG. 4 shows the operation for every machine cycle. Cycles 1--2, 5, 7, and 8 are called "idle cycles" because ALU 30 does not perform any operations during these cycles. Cycle 3 is also an idle cycle. However, in the present embodiment, ALU 30 is used as a register to hold the index offset data during idle cycle 3. FIG. 5 shows the control signals generated during the corresponding machine cycle.

It is assumed that program counter 34 has stored the address data of a first instruction word containing the operation code of the AIM instruction, which will be read out from memory unit 16 during the coming cycle 1.

Cycle 1

The high-order byte and the low-order byte of the address data are supplied to memory unit 16 via buses BH and AH, buses BL and AL, and selector 56, under the control of signals S7, S8, and S16, respectively. At this time, the operation code of the AIM instruction is read out from memory unit 16 to instruction register 18, is decoded by instruction decoder 20, and is supplied to control unit 12. In response to this decoded signal, control unit 12 sends control signals to execution, circuit 14.

The high-order byte of the address data is supplied, under the control of signal S9, to I/D register 36A via address bus BH, while the low-order byte is supplied, under the control of signal S10, to I/D register 36B via address bus BL. At this time, the content of address counter 36 is incremented by "1", under the control of signals S9 and S10. When the content of register 36B is "FF" (hexadecimal), this increment operation causes the content of register 36B to change to "00" and adds "1" to the content of register 36A.

Cycle 2

The data in I/D registers 36A and 36B are supplied to memory unit 16, under the control of signals S9, S10, and S16, as address data for the second instruction word (or index offset data) via address buses BH and AH, address buses BL and AL, and selector 56, respectively. Memory unit 16 reads out the index offset data from the designated address location, and places it onto data bus DB. On the other hand, I/D registers 36A and 36B respectively latch the data on buses BH and BL, under the control of signals S9 and S10. The latched data of address counter 36 is incremented by "1", under the control of signals S9 and S10.

Cycle 3

Cycle 3 is an idle cycle in other data processing systems. In the present embodiment, however the ALU performs the operation described below. The data in I/D registers 36A and 36B are supplied to memory unit 16, under the control of signals S9, S10 and S16, as the address data for the third instruction word (or the immediate data) of the AIM instruction via address buses BH and AH, address buses BL and AL, and selector 56, respectively. At this time, transfer switch 54 is turned on under the control of signal S15, and the data "00" (hexadecimal number) is supplied to X-input data bus BX. On the other hand, the index offset data read out in cycle 2 is supplied from data bus DB to Y-input data bus BY via selector 46, under the control of signal S2. ALU 30 adds together the index offset data supplied to the Y-input port, and the data "00" supplied to the X-input port, under the control of signal S17. Then, the immediate data is read out from the designated address location of memory unit 16, onto data bus DB. At the same time, I/D registers 36A and 36B respectively latch the data on buses BH and BL, under the control of signals S9 and S10. The content of address counter 36 is then incremented by "1", under the control of signals S9 and S10.

Cycle 4

The contents of I/D registers 36A and 36B are loaded into PH register 34A and PL register 34B, under the control of signals S9 and S10, respectively, as the address data for fetching the next instruction word of the AIM instruction. The address data is kept stored in program counter 34 until the start of the fetch cycle of the next instruction word of the AIM instruction. on the other hand, the immediate data on data bus DB is stored in temporary register 40, under the control of signals S2 and S12, via selector 46 and intermediate bus BI.

In parallel with these operations, the content of XL register 42B is supplied to X-input port of ALU 30 via X-input data bus BX, under the control of signal S14. The data representing the result of addition by the ALU is fed back to the Y-input port of ALU 30 via selector 44 and Y-input data bus BY, under the control of signal S1. ALU 30 adds the content of XL register 42B supplied to X-input port and the data representing the result of addition, supplied to Y-input port (i.e. index offset data), under the control of signals S17. The content of register 42B is further supplied to I/D register 36B via X-input data bus BX, transfer switch 52, and address bus BL, under the control of signals S14, S5, and S10. The content of XH register 42A is supplied to temporary register 38 and I/D register 36A via address bus BH, and is stored in respective registers, under the control of signals S13 and S11. Then, the content of I/D register 36A is incremented by "1".

Cycle 5

The data representing the result of the arithmetic-logic operation performed in cycle 4 is supplied, as the low-order address data of the RAM data, from ALU 30 to memory unit 16, via selector 44, intermediate bus BI, selector 56, and address bus AL, under the control of signals S1 and S16. If the result data contains a carry, the content of I/D register 36A is supplied to memory unit 16 via address bus BH and address bus AH, as the high-order address data of the RAM, under the control of signals S9. On the other hand, if the result data has no carry, the content of temporary register 38 is supplied to memory unit 16 via address buses BH and AH, under control of signal S11.

Memory unit 16 reads out data from the address location designated by this RAM data address and applies it to data bus DB. The high-order byte of the RAM data address is supplied to I/D register 36A, under the control of signal S9, via address bus BH while the low-order byte is supplied to I/D register 36B, under the control of signal S10, via intermediated bus BI.

Cycle 6

The contents of I/D registers 36A and 36B, i.e., the address of RAM data, are supplied to address buses BH and BL, under the control of signals S9 and S10. The data on data bus DB is supplied to the X-input port of ALU 30, via selector 46, intermediate bus BI, transfer switch 50, and X-input data bus BX, under the control of signals S2 and S4.

The content of temporary register 40, i.e., immediate data, is supplied to the Y-input port of ALU 30 via Y-input data bus BY, under the control of signal S12. ALU 30 performs an AND operation on the RAM data and immediate data, under the control of signal S7. The data on address buses BH and BL is latched by I/D registers 36A and 36B, as address data for RAM data, under the control of signals S9 and S10.

Cycle 7

The contents of I/D registers 36A and 36B are supplied, to memory unit 16, under control of signals S10, S16, and S9, via address buses BH and AH, address buses BL and AL, and selector 56. The result of the AND operation performed in cycle 6 is supplied from ALU 30 to memory unit 16, under control of signals S10, S1, and S3, via selector 44, Y-input data bus BY, transfer switch 48, and data bus DB. Memory unit 16 stores this data in the address location designated by the content of address counter 36. The execution of the AIM instruction ends at this point.

Cycle 8

The contents of PH and PL registers 34A and 34B of program counter 34, are supplied, under the control of signals S7 and S8, to address buses BH and BL, respectively, as the address data for the first instruction word of the next instruction.

In this embodiment, ALU 30 performs an addition in cycle 3. The value of index offset data is not changed by this addition. In other words, ALU 30 functions as a register for storing index offset data in cycle 3.

This data-processing device can, therefore, execute the AIM instruction in seven machine cycles.

If ALU 30 does not perform addition of "00" (hexadecimal) and the index offset data, and if the number of registers is limited to the number in the embodiment of the present invention, then the execution of the AIM instruction requires twelve machine cycles. The reason for this requirement is that the index offset data has to be temporarily stored in memory unit 16, in order to prevent the data in the accumulator register from being erased. The addressing of memory unit 16 undesirably requires more machine cycles than in this present invention.

If the instruction-word format of the AIM instruction is arranged in the order of operation code, immediate data, and index offset data, the AIM instruction can be executed in the same number of cycles as in this embodiment. However, the instruction of the ordinary index mode is written in the instruction-word format, which has an order of operation code and index offset data. The format thus arranged forms an irregular format, which is not practical, since coding errors are more likely to occur when a programmer does manual assembling.

As has been described above, according to the present invention, the AIM instruction can be executed without the need to increase the number of registers.

While, in the above-described embodiment, memory unit 16 is formed in the same chip together with the other logic components, memory unit 16 also may be formed in a separate chip, with wiring similar to the above-described embodiment.

In the above-described embodiment, ALU 30 performs an addition when the data of "00"(hexadecimal)

is supplied to the X-input port of ALU 30 by means of transfer switch 54. However, ALU 30 could also be controlled to perform a subtraction or an "OR" operation that does not change the value of the index offset. For example, transfer switch 54 could be connected between data bus BX and the power source terminal, which has a potential of 5V, in order to supply the data of "FF"(hexadecimal) to the X-input port of ALU 30. When the data of "FF" is supplied by means of transfer switch 54, ALU 30 would be controlled to perform an "AND" operation.

In the above-described embodiment, the data of "00" (hexadecimal) and the index offset data are added together during cycle 3. However, it is possible to add the index offset data to the content of XL register 52B during cycle 3, and to add the result to the data of "00" during cycle 4.

What is claimed is:

1. A data processing device performing a series of instructions, at least one of the instructions being a selected arithmetic-logic instruction specifying at least one arithmetic-logic operation and input data, said data processing device comprising:
   arithmetic-logic means for performing said at least one arithmetic-logic operation specified by the selected arithmetic-logic instruction in said series, said arithmetic-logic means performing said at least one arithmetic-logic operation during instruction cycles composed of at least one machine cycle;
   clock generating means, connected to said arithmetic-logic means, for generating a clock signal defining said machine cycles for said arithmetic-logic means, wherein a machine cycle during which said arithmetic-logic means performs no arithmetic-logic operation specified by said selected arithmetic-logic instruction is called an idle cycle;
   control means, connected to said clock generating means and said arithmetic-logic means, for sending said input data specified by said selected arithmetic-logic instruction to said arithmetic-logic means, and for causing, during an idle cycle, said arithmetic-logic means to produce output data identical to said input data so that said input data is temporarily stored in said arithmetic logic means;
   memory means for storing the series of instructions and said input data; and
   bus means for connecting said memory means to said arithmetic-logic means and said control means.

2. The data processing device of claim 1, wherein said selected arithmetic-logic instruction includes an operation code specifying said at least one arithmetic-logic operation, and
   wherein said control means includes:
   an instruction register for storing the operation code of said selected arithmetic-logic instruction;
   an instruction decoder connected to said instruction register for decoding the operation code stored in said instruction register and for producing an output signal according to the operation code; and
   a control circuit connected to said instruction decoder for controlling said arithmetic-logic means according to said output signal of said instruction decoder.

3. The data processing device of claim 2, wherein said arithmetic-logic means includes:
   an address counter;
   an arithmetic-logic unit, having inputs, and performing, during an idle cycle, a predetermined arithmetic-logic operation on index offset data received from said memory means at a first one of said inputs, responsive to said control circuit; and
   a data supply section for supplying predetermined data to a second one of said inputs of said arithmetic-logic unit, during said idle cycle, responsive to said control circuit.

4. The data processing device of claim 3, wherein said predetermined data is a plurality of Boolean zeroes, and wherein said predetermined logic-operations include addition, subtraction, and "OR" operations.

5. The data processing device of claim 3, wherein said predetermined data is a plurality of Boolean ones, and wherein said predetermined arithmetic-logic operations include an "AND" operation.

6. The data processing device of claim 3, wherein at least said selected arithmetic-logic instruction has a three word instruction format, said three words of said instruction format including a word having said index offset data, said three words being stored in succession in said memory means and wherein, responsive to said control circuit, said arithmetic-logic unit receives said index offset data from said memory means during said idle cycle.

* * * * *